Aug. 29, 1933.     C. BRADLEY     1,924,148
PNEUMATIC INNER TUBE
Filed Aug. 4, 1930
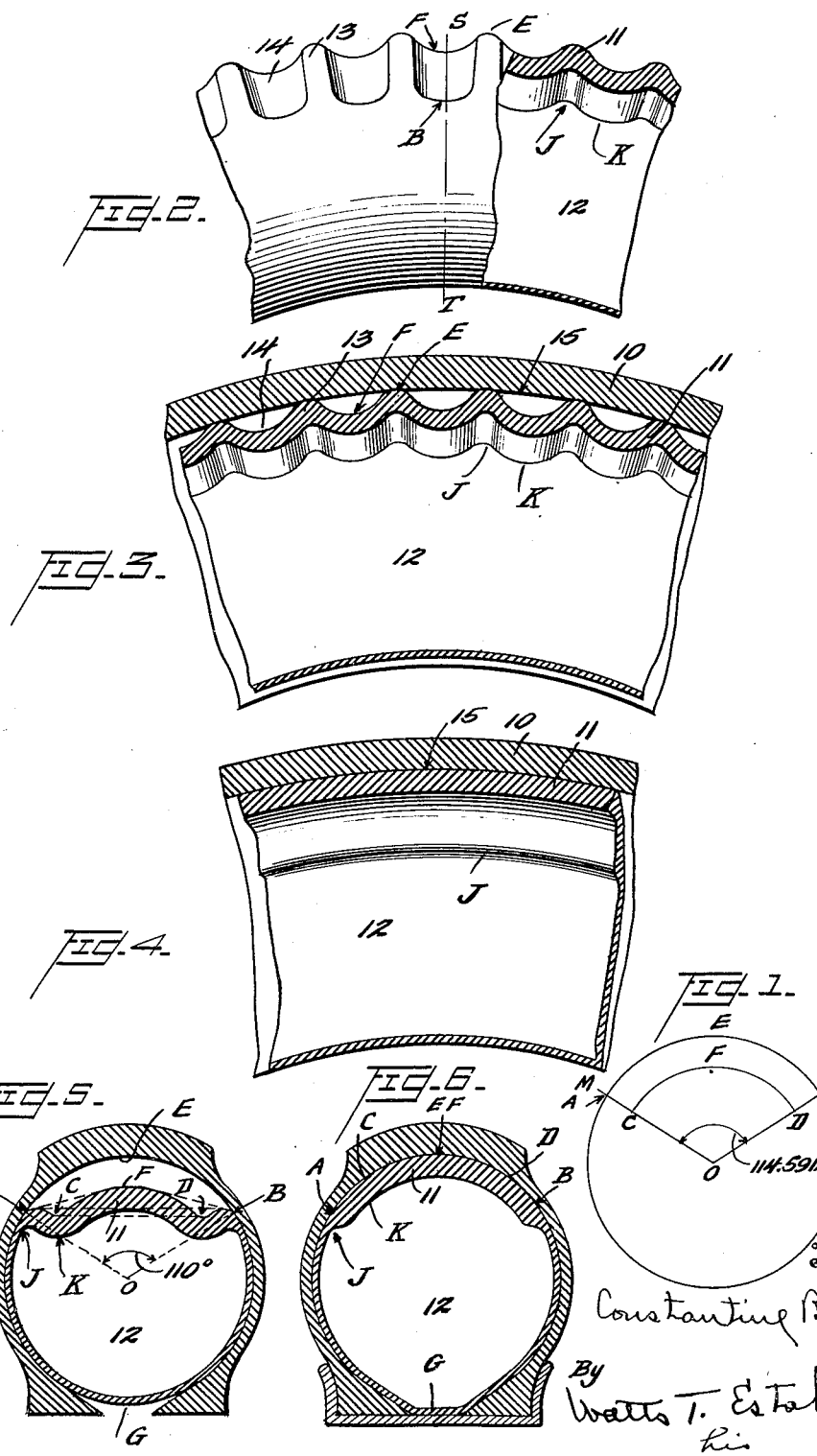

Patented Aug. 29, 1933

1,924,148

UNITED STATES PATENT OFFICE 1,924,148

PNEUMATIC INNER TUBE

Constantine Bradley, Nashville, Tenn.

Application August 4, 1930. Serial No. 472,928

6 Claims. (Cl. 152—13)

My invention relates to an improvement in puncture healing inner tubes for pneumatic tires. The purpose of my invention is to provide an inner tube so formed along its outer periphery, which comes into contact with the inner surface of the tread portion of the casing or for a distance beyond the tread portion, that the said outer periphery portion of the inner tube will be brought into a state of compression longitudinally of the tread upon the inner tube being inflated, and at the same time said outer periphery portion of the inner tube being approximately in a normal state in cross-section, thereby causing punctures in the outer periphery of the inner tube to be automatically closed.

The invention consists in forming the tread portion of an inner tube with transverse raised and depressed portions, the transverse raised portions conforming approximately to and lying approximately against the inner surface of the tread portion of the casing upon the inner tube being introduced prior to inflation. The depressed portions, or indentations, stand away from the inner surface of the tread portion of the casing while the inner tube is deflated, but upon the inner tube being inflated the depressed portions or indentations will be forced outwardly toward the inner surface of the tread portion of the casing and seat, or approximately seat, against the inner surface of the tread portion of the casing. Owing to the formation of the ends of the depressions or indentations, as will hereinafter be shown, the tread portion of the inner tube, upon the same being inflated, will be approximately in a normal state in cross-section, and at the same time will be brought into a state of compression longitudinally of the tread. The compression thus brought about being almost entirely confined to the tread portion of the inner tube longitudinally of the tube, thus building compression against compression throughout the length of the tread upon the inner tube being inflated, while the tread portion of the inner tube will be approximately in a normal state in cross-section upon the tube being inflated. The thickness of the tread portion and character of elastic material used will depend upon the amount of compression desired or the amount of stock wished in the tread portion of the inner tube subject to the discretion of the manufacturer.

The invention consists of certain novel features of construction and combinations of parts which will be hereinafter described and pointed out.

In the accompanying drawing Figure 1 is a circle, arc AEB of which is contained between the lines MO and NO, which includes an angle of 114.5912-plus degrees, and the arc CFD, which is included between the lines MO and NO, is an arc of a smaller circle with a common center;

Figure 2 is a detailed view, partly in elevation, of a vertical section of the inner tube, the same being deflated;

Figure 3 is a detailed view in elevation of a vertical section of an outer casing with half of an inner tube therein, prior to inflation;

Figure 4 is a similar sectional detailed view as shown in Figure 3, with the inner tube inflated;

Figure 5 is a cross-sectional view of a deflated inner tube shown along line ST in Figure 2; and, Figure 6 is a cross-sectional view of an inflated inner tube shown along the line ST in Figure 2.

The outer casing 10 may be of any construction and as it forms no part of this invention requires no specific description.

This invention rests partly upon the principle that the parts of two radii which enclose an angle of 114.5912-plus degrees included between the arcs of two circles with a common center, plus the smaller arc, are equal to the arc of the larger circle included between said two radii. In Figure 1 the radius AO plus the radius BO, which encloses an angle of 114.5912 degrees plus, are equal in length to the arc AEB. From this it can be demonstrated that the line AC (Fig. 1) plus the arc CFD plus the line DB is equal to the arc AEB, and so with any other smaller arc that is inscribed through the two radii AO and BO with O as a center. It results that if we take the large circle in Figure 1 as a cross-section of an inner tube and let the line AC plus the arc CFD plus the line DB represent the contour of one of the indentations or depressed portions of the tread portion thereof, said contour will be equal to the arc AEB, which conforms, or practically conforms, to the inner surface of the tread portion of the casing enclosing said inner tube, and upon said inner tube being inflated the contour of the indentations or depressed portions, being line AC plus arc CFD plus line DB, would coincide and lie approximately normally against the inner surface of the tread portion of the casing along the arc AEB.

In practice the indentations or depressed portions would most likely not follow the directions of the line AC, arc CFD, and line DB, since it would be more practical to round the corners off and probably change the form of arc CFD, and to either increase or decrease the angle AOB so as to compensate for the rounding of said points and change in arc CFD, and also to compensate for the lateral expansion of the depressed portions upon the same being forced outwardly to the inner surface of the outer casing and put under compression. I wish it distinctly understood that Figure 1 and the explanation thereof are not intended to show the exact form of the depressions of my inner tube in cross-section, but are used to illustrate the principle involved, which is to form the tread portion of an inner tube in such a way that said tread portion will be in compression longitudinally of the tread and lie normally or approximately normally in cross-section of the tread, including the depressed portions or indentations, upon the inner tube being inflated within a casing.

The inner tube is made of any suitable elastic material such as employed in the manufacture of such tubes employed in connection with the outer casings of automobiles and the like. The tread portion 11 of the tube is preferably made of thicker rubber than the main body or remainder of the tube 12, and is provided in its surface with transverse raised portions 13 and depressions 14, alternately arranged circumferentially of the inner tube. In illustrating the raised and depressed portions 13 and 14, it is not necessarily intended that this invention and application be specifically limited to the structure herein shown as any form or size of raised or depressed portions may be employed that is most suitable in obtaining the desired compressed state of the tread portion with respect to the inner surface of the outer casing.

In Figure 3 is illustrated the state of the tread portion 11 of the inner tube, prior to inflation of the inner tube within the outer casing 10. The inner tube may be introduced into the casing in a deflated condition or it may be partially inflated and introduced into the outer casing and after it has been placed therein it will be inflated to the number of pounds of pressure required for practical road purposes, whereupon the tread portion will be affected to cause the indentations or depressed portions 14 to be brought into contact, or approximately into contact, with the inner surface of the outer casing 10, so that the walls of the depressions 14 will lie in the same annular plane, or approximately in the same annular plane, with the raised portions 13 of the tread portion of the inner tube, as shown in Figure 4.

Figure 5 is a cross-section of the inner tube 12 on the line ST of Figure 2 and shows the position of the rubber in the tread portion of one form of depression prior to inflation. The depressions 14 are so constructed that the curved line AC (Fig. 5) plus the arc CFD plus the curved line DB is equal to, or approximately equal to, the arc AEB. The curved line AC, the arc CFD, and the curved line DB, representing a line traced from the outer edge of one of the depressions at A to the bottom of the depression at C along the trough of the depression to the point D and up to the edge of the depression at B on the opposite side. The arc AEB represents the contour of the crest of a normal area of the inner tube, and also approximately represents the contour of the inner surface of the tread portion of an outer casing enclosing said inner tube, against which the depressed area will be forced upon the inner tube being inflated, as shown in Figure 6. The line AC represents one end of the depression and line BD represents the other end of the depression. The line CFD represents the bottom or trough of the depression. Points A and B represent the outer extremities of the ends of the depression and points C and D represent the inner extremities of the ends of the depression. The arc AEB represents a raised portion. The area between the arc AEB and the line ACFDB represents one side of the depression. A line connecting the points E and F would correspond with the curved line EF in Figures 2 and 3.

It will be observed that the inner extremities of the ends, C and D, lie below the straight line AB, connecting the outer extremities of the ends, A and B. Also that the bottom or trough of the depression CFD lies above the straight line CD, connecting the inner extremities of the depressions, C and D.

It will also be noted that the curved lines AC and BD, representing the cross-sectional view of the ends of the depression, lie in different directions from the curved line CFD, representing the cross-sectional view of the bottom or trough of the depression, and as a result the line ACFDB has greater length than the straight line AB or the continuous curved line AFB, connecting the outer extremities of the ends of the depression, A and B.

Figure 6 illustrates the position that will be taken by the tread portion 11 upon the inner tube being inflated in a casing. It will be noted that the curved line AC, the arc CFD, and the curved line DB, will coincide with the arc AEB, upon the inner tube being inflated, as shown in Figure 6. The tread portion 11, upon the inner tube being inflated within a casing, will lie normally in cross-section along the arc AEB, which represents the inner surface of the tread portion of the casing. That is, the tread portion 11 will not be stretched, or only slightly stretched, in cross-section along the line AEB upon the inner tube being inflated within the casing.

Figure 3 illustrates a longitudinal cross-sectional view of the inner tube in a deflated condition within a casing. By reason of the depressions 14, the perimeter or tread portion of the inner tube, which is made up of the depressed portions 14 and raised portions 13, contains a greater amount of material and has a greater circumferential length throughout the length of the tread portion thereof than the inner surface of the tread portion of the outer casing 15, so that upon the inner tube being inflated the depressed areas 14 will be forced outwardly against the inner surface of the tread portion of the casing 15, which will cause the tread portion of the inner tube to become in a compressed state circumferentially of the tread, as shown in Figure 4. Therefore, should the tread portion of the inner tube be punctured while the tube is inflated, the opening or puncture will be automatically closed, or sealed by reason of the compressed condition of the inner tube.

It is not necessarily intended that this invention and application be specifically limited to the structure of the raised portions and depressed portions longitudinally of the tread, as shown in Figure 3. The depths of the depressions, widths of the depressions and the contour of the depressions longitudinally of the tread will vary according to the amount of compression that may be desired longitudinally of the tread or to secure the proper action of the rubber in the tread, in the course of inflation or in the use of the tube.

This invention resides primarily in maintaining the tread portion of the inner tube in a state of compression longitudinally of the tread and at the same time maintaining the tread portion of the inner tube in practically a normal or slightly compressed state in cross-section upon the tube being inflated, this result being obtained by so forming the depressions that the line AC plus the arc CFD plus the line BD is equal to, or approximately equal to, the arc AEB, as shown in Figure 5. No claim is made as to the remainder of the inner tube shown as AGB in Figures 5 and 6, and of course as to whether said remaining portion of the tube would be in a distended or in a normal condition upon the inner tube being inflated would depend upon the form in which said remaining portion was made, conditioned upon the wishes of the tube manufacturer.

When the tube is introduced in an outer casing of a road vehicle for service purposes and is inflated, the outer casing confines the inner tube therein and prevents the tread portion of the inner tube from being distended and thereby affords a means of causing the depressions of the inner tube along the tread portion to be brought into contact therewith. The tread portion will therefore always be in a state of compression longitudinally and in practically a normal or slightly compressed state in cross-section according to the forms of the depressions, upon the inner tube being inflated, and should the inner tube be subjected to a puncture the opening would be closed by reason of the compressed condition of the tread portion thereof, which is contrary to what would happen should the tread portion of said inner tube be in a distended or normal condition, which would cause the opening or puncture to be enlarged or held in an open state when punctured.

Having described my invention, what I claim as new and desire to secure by Letters Patent is:

1. An inner tube, comprising a body having the tread portion of comparatively thick rubber the circumferential length of the surface of the inner tube being greater than the circumferential length of the inner surface of a tire casing, said tread portion formed in rows of raised and depressed portions along the periphery of said tread portion, so that the tread portion of the inner tube will be in compression circumferentially of the tread and be in a normal or approximately normal state in cross-section upon the tube being inflated within a tire casing.

2. An inner tube, comprising a body of elastic material, having a tread portion, the circumferential length of the surface of the inner tube being greater than the circumferential length of the inner surface of a tire casing, a series of raised and depressed portions arranged transversely of the tread portion, the contour of each deflated depressed portion being of a curvature equal or approximately equal to the length of a line drawn along a transverse raised portion of the tread of the tube subtended by an angle of the same number of degrees as subtends the depression.

3. An inner tube for pneumatic tires comprising an endless tubular member of elastic material, the outer periphery or tread portion of which is made up of alternating raised portions and depressions lying transverse of the tread throughout the tread portion, the contour of the raised portions, when the tube is in a deflated condition, approximately fitting the inside of the casing in which the tube is to be used, the cross-sectional contour of each depression, when the tube is in a deflated condition, being of greater length than a straight line or curved line connecting the ends of the depression so that when the inner tube is inflated within the tire casing the tread portion of the inner tube will be in a state of compression.

4. An inner tube comprising a body having a tread portion, said tread portion being provided with a plurality of raised portions and depressions lying transverse of the tread, the contour of the depressions in cross-section when the tube is in a deflated state being formed of a curved portion and at the ends of the curved portion the depression extending outwardly therefrom producing a broken contour, said contour of the depression being of a greater length than a straight or curved line connecting the ends of the depression, and the sides of the depression sloping away from the raised portions of the tread to the bottom or trough of the depression so that when the inner tube is inflated within the tire casing the tread portion of the inner tube will be in a state of compression.

5. An inner tube, comprising a body of elastic material, having a tread portion, a series of raised and depressed portions arranged transversely of the tread portion, the circumferential length of the surface of the tread portion of the inner tube being greater than the circumferential length of the inner surface of the tread portion of the tire casing, the contour of each deflated depressed portion of a length equal or approximately equal to the length of a line drawn along a transverse raised portion of the tread of the tube.

6. An inner tube for pneumatic tires comprising an endless tubular member of elastic material, the outer periphery, or tread portion of which is made up of alternating raised portions and depressions lying transverse of the tread, throughout the tread, the contour of the raised portions, when the tube is in a deflated condition, approximately fitting the inside of the casing in which the tube is to be used, said depressions having the ends thereof provided with inner and outer extremities the ends of each depression approximately coinciding with the directions of the radii drawn from the cross-sectional center of the tube to the outer extremities of the ends, and the trough or bottom of each depression approximately coinciding with an arc drawn from the cross-sectional center of the tube and connecting the inner extremities of the ends of the depression, the sides of the depression sloping away from the raised portions to the trough or bottom of the depression.

CONSTANTINE BRADLEY.